United States Patent

Ugawa et al.

[19]

[11] Patent Number: 5,822,331
[45] Date of Patent: Oct. 13, 1998

[54] BIT ERROR MEASURING APPARATUS

[75] Inventors: Hiroaki Ugawa; Atsushi Hattori, both of Hyogo, Japan

[73] Assignee: Hewlett-Packard Company, Palo Alto, Calif.

[21] Appl. No.: 521,658

[22] Filed: Aug. 31, 1995

[30] Foreign Application Priority Data

Sep. 14, 1994 [JP] Japan .................................. 6-247140

[51] Int. Cl.$^6$ .................................................. G06F 11/00
[52] U.S. Cl. .......................................................... 371/5.1
[58] Field of Search ................................. 371/5.1, 20.4, 371/20.1, 27, 25.1, 21.1; 395/185.07

[56] References Cited

U.S. PATENT DOCUMENTS 5,293,382  3/1994  Knefel ........................................ 371/3
5,414,713  5/1995  Waschura et al. ...................... 371/20.4
5,541,942  7/1996  Strouss ................................... 371/21.3

Primary Examiner—Phung M. Chung

[57] ABSTRACT

A system efficiently determines and stores in memory the logical bit positions of bits in which bit errors have occurred in digital recording devices, etc. The system measures bit errors by comparing a test bit string with a correct bit string, and includes a bit string memory that stores the correct bit string, a word comparator for comparing corresponding words from the test bit string and the correct bit string, an error word content memory that stores the contents of the words containing errors, and an error word position information memory that shows the positions in the correct bit string which correspond to error words in the test bit string that contain the errors. Bit error information in a desired visual format is obtained by performing calculation processing on these memory values.

4 Claims, 8 Drawing Sheets

BIT ERROR MEASURING APPARATUS

FIELD OF THE INVENTION

This invention relates to a method for deriving data concerning read errors (below, "bit error information") of digitally recorded data, such as bit error numbers, bit error rates, burst errors, etc., in bit error measurements of digital recording devices (below, "recording devices") and digital recording media (below, "recording media").

BACKGROUND OF THE ART

When physical positions at which bit errors have been produced in digital recording devices are investigated, or when the question of whether bit errors that have been measured are burst errors or not is investigated, etc., it is necessary to know in which bits within the bit string the errors have occurred. In a first prior art technique, the entire bit string to be measured is first stored in a memory device. Then, it is compared with a correct bit string in a separate memory device, in a batch-wise manner, and errors are detected. A measure is thus derived of bits within the bit string where the errors occur.

A second prior art technique causes the bit string to be measured is compared with the correct bit string in real time, bit by bit. When the compared bits do not agree, information concerning in which bits the errors occur is stored in memory. An example of this method is shown in FIG. 10. In FIG. 10, errors occur in three bits, i.e., bit positions 4, A, and D in the bit string. This bit position information is stored in an error bit position information memory. The error bit position information memory allots thirty two bits to one item of bit position information. Since the bit errors are stored in bit units, the needed memory capacity increases in proportion to the number of errors in the measured bit string.

The prior art does not always require storage of the correct bit string in the memory of the measurement device. There are also methods in which the correct bit string is externally input or, in the case in which a pseudo-random bit string is used, it is produced a bit at a time inside the measurement device, etc.

The results of a measured error rate are ordinarily displayed, as in FIG. 8, in such a way that the logical string of measured object data, data blocks, etc., is arranged along the horizontal axis, and the bit error number or bit error rate is placed on the vertical axis. When the distribution of measured burst errors, as in FIG. 9, is displayed, the burst length is ordinarily shown on the horizontal axis and the number of appearances is shown on the vertical axis; the relationship with the physical position in the recording media is not displayed.

In the first prior art method mentioned above, since the entire bit string to be measured must be stored in memory, substantial memory capacity is needed in the measurement device. Since there are practical limits to the memory capacity, the following drawbacks occur. In cases in which the error rate of the bit string to be measured is small, a sufficient number of samples of errors is not obtained, and the measured value of the error rate is inaccurate. Moreover, even when the error rate is not small, the size of the bit string that can be stored in memory corresponds to only one track (e.g., in the case of a disk recording medium (below, "disk")). Thus, the distribution of error rates cannot be exhibited on a diagram of the whole disk, such as shown in FIG. 7.

In the second prior art example mentioned above, since only the positions of the bits containing errors are stored in memory, the quantity of memory needed is less than in the first example. However, since the bit errors are stored in bit units, when bit strings with high bit error rates are measured, a large memory capacity is needed. Moreover, since the bit string to be measured is compared in real time, high-speed circuit elements are also required.

Further, as mentioned above, the correct bit string is not necessarily stored in the measurement device. However, in certain specific bit patterns, there is a phenomenon wherein the probability is high that a bit error will occur. When one is trying to investigate the presence of such bit patterns, it is necessary to store the correct bit string in memory.

Among the important items involved in evaluating disks, are non-uniformities, damage, distortions of shape, etc., and in evaluating these items it is necessary to grasp the physical positions of the bit errors. Moreover, because of the necessity, in recording devices as well as recording media, of mutually evaluating the recording device and the recording medium, all of the aforementioned factors are important items in the evaluation. However, with the prior art, it was difficult to measure the logical positions at which bit errors were produced, and the same was true for the physical positions on the recording medium. Even though logical positions could be measured by the prior art, there were limits on the lengths of the bit string that could be measured (in the first example), Further, the range in which physical positions were shown was too narrow, so that the method could not be used to evaluate disks.

Moreover, in the second prior art example, when the error rate became too high, the length of the bit string that could be measured was short, and the same kinds of drawbacks were evident as in the first prior art example.

Accordingly, a measurement device is desired which can efficiently measure and store in memory the logical positions of bits in long bit strings, where bit errors are produced, unrelated to the size of the bit error rate, such as those covering an entire range of a disk. Then, bit error information could be displayed in terms of the bit's physical positions, enabling a user to grasp the measurement both visually and intuitively.

SUMMARY OF THE INVENTION

A system efficiently determines and stores in memory the logical bit positions of bits in which bit errors have occurred in digital recording devices, etc. The system measures bit errors by comparing a test bit string with a correct bit string, and includes a bit string memory that stores the correct bit string, a word comparator for comparing corresponding words from the test bit string and the correct bit string, an error word content memory that stores the contents of words containing errors, and an error word position information memory that shows the positions in the correct bit string which correspond to error words in the test bit string that contain the errors. Bit error information in a desired visual format is obtained by performing calculation processing on these memory values.

EXPLANATION OF SYMBOLS

Figure 1:
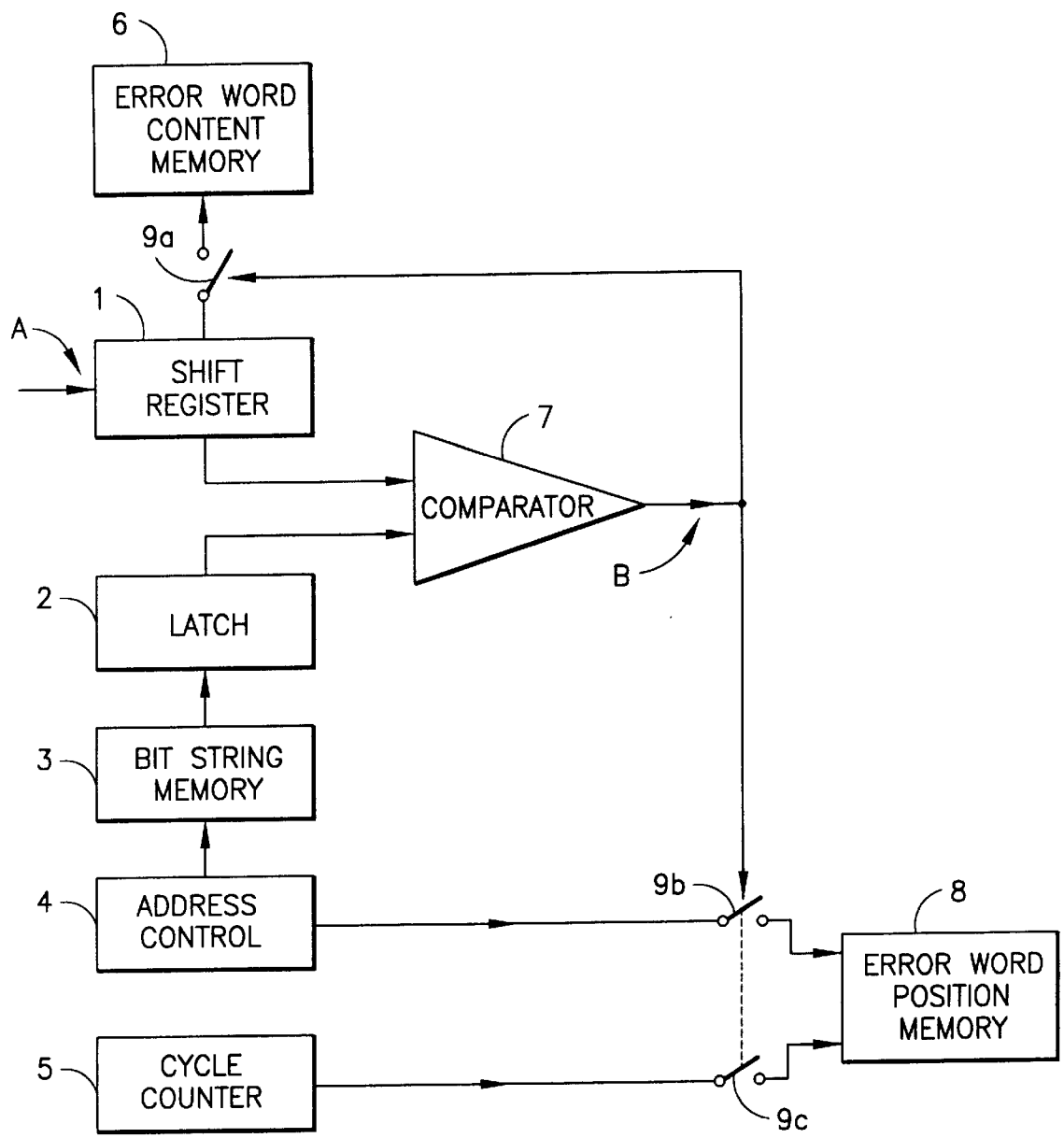
FIG. 1 is a block diagram showing a first embodiment of the invention.

1: Shift register
2: Latch
3: Bit string memory
4: Address control part
5: Cycle counter
6: Error word content memory
7: Comparator
8: Error word position information memory
9a, 9b, 9c: Switches
10: Bit Error memory
11: Comparator
A: Bit series to be measured
B: Error detection signal

DETAILED DESCRIPTION OF THE INVENTION

The measurement device of this invention is provided with a means for producing a correct bit string; a means for comparing a bit string to be measured with the correct bit string; a memory in which the contents of the words or bytes containing errors are stored, or a memory in which the contents of the errors are stored, and a memory which stores address information of words or bytes of the correct bit string which correspond to words or bytes that contain the errors.

The logical positions where bit errors were produced are measured by the aforementioned means. The measurement results are processed by calculation to convert them to the desired mode of display. For example, they may be superimposed on a diagram modeling the form of the actual recording medium and be shown on the display screen of the measurement device.

As shown in FIG. 1, a bit string being measured is formatted in 8-bit byte units or word units (which are an integral number of units), etc., and compared with the correct bit string by means of a comparator 7 (below, "words" or "bytes" are referred to by the general term "word"). If bits that do not agree are detected as a result of the comparison, the contents of the words that contain the errors in the bit string being measured are stored in a memory 6, and at the same time the addresses of the words in the correct bit string, which was the object of comparison, are stored in an error word position information memory 8.

With respect to bit error measurements that are performed to determine the performance of recording devices or recording media, the measurement results are displayed in a form that models the physical shape of the actual recording medium. In this manner, the distribution of bit errors can be grasped visually by making them correspond to the physical positions on the recording medium. By then referring to the physical positions of these bit errors, it is possible to evaluate gaps, scratches, and distortions in the shape of the disk, as well as states of contact between tapes and heads.

In FIG. 1, a serial input bit string A to be measured is subjected to serial/parallel conversion by a shift register 1 and divided into word units. A correct bit string is sent to a latch 2 from a bit string memory 3. The bits of the bit string to be measured and the correct data are compared by comparator 7, in word units. If there is even one bit that does not agree in a word, an error detection signal B is generated by comparator 7. When signal B is generated, a switch 9a is closed, and the contents of shift register 1 are stored in error word content memory 6. Simultaneously, a switch 9b is closed, and the address information of the correct data in bit string memory 3 is sent from address control part 4 to error word position information memory 8. That is, the addresses of the correct bit string are stored as positional information of the error words.

Figure 2:
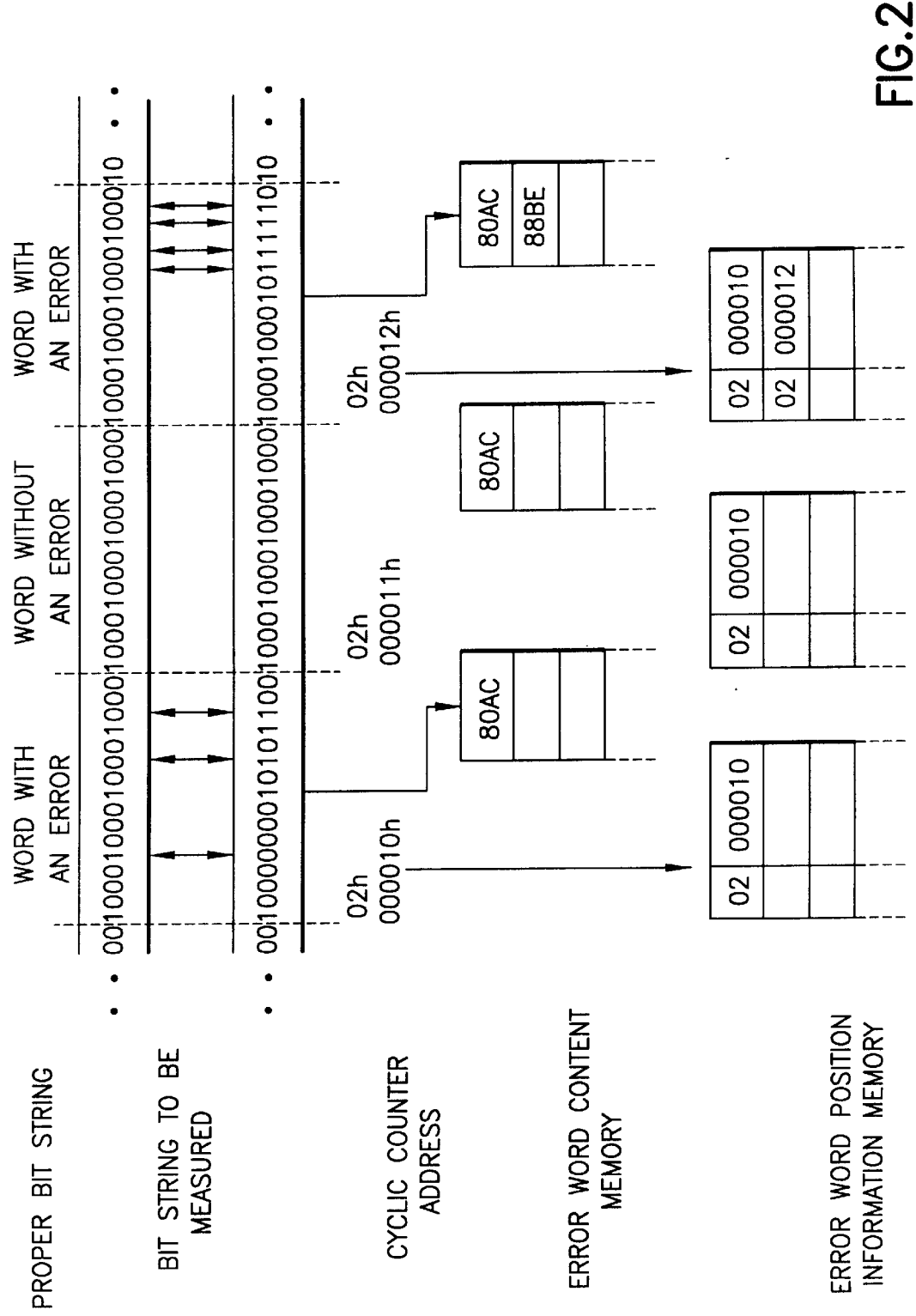
FIG. 2 is a diagram of an example of the invention wherein error bit position information is stored.

FIG. 2 shows an example of three consecutive words in a bit string. Since there is an error in the first word, its content, 80AC (hexadecimal), is stored in error word content memory 6. Moreover, the address information 000010 (hexadecimal) is stored in the error word position information memory 8 (the value 02 in the 2 highest bits of the memory is discussed below). Next, since there are no errors in the next word, nothing is written to either error word content memory 6 or error word position memory 8. Since there is an error in the next word, the content of this word, 88BE, is stored in error word content memory 6, and simultaneously, its address, 000012, is stored in error word position memory 8.

Switch 9 is shown schematically in FIG. 1 in order to show the data flow of this invention in an easily understood manner. As will be understood by those skilled in the art, switch 9 is not limited to mechanical switches and may be constituted by an electronic switch, etc.

Bit string memory 3 has a smaller capacity than the data capacity of the recording medium. Therefore, using disks as an example, in order to measure the bit errors of an entire disk, an amount of data within the capacity that can be stored in bit string memory 3 is repeatedly recorded on the disk, read out and tested. That is, since the same data are compared a number of times, a cycle counter 5 is provided which counts test cycles. The information concerning the number of cycles is stored in error word position information memory 8, together with the address, and thus the position information for a large quantity of data can be accurately identified.

In the example of FIG. 2, 02 (hexadecimal) is counted in cycle counter 5. This value is stored in the two highest bits of error word position information memory 8. Therefore, error word position information memory 8 stores a total of 32 bits for the word position, 8 bits for the cycle counter part plus the address information.

In the structure of FIG. 1, words containing errors that have been stored in error word content information memory 6 and the corresponding words of the correct bit string (i.e., the contents of bit string memory 3, which are stored at the addresses stored in error word position information memory 8) are compared by calculation processing, and the logical positions of the error bits in the words are obtained. In this manner, the logical positions of all of the bits with errors are obtained.

Figure 3:
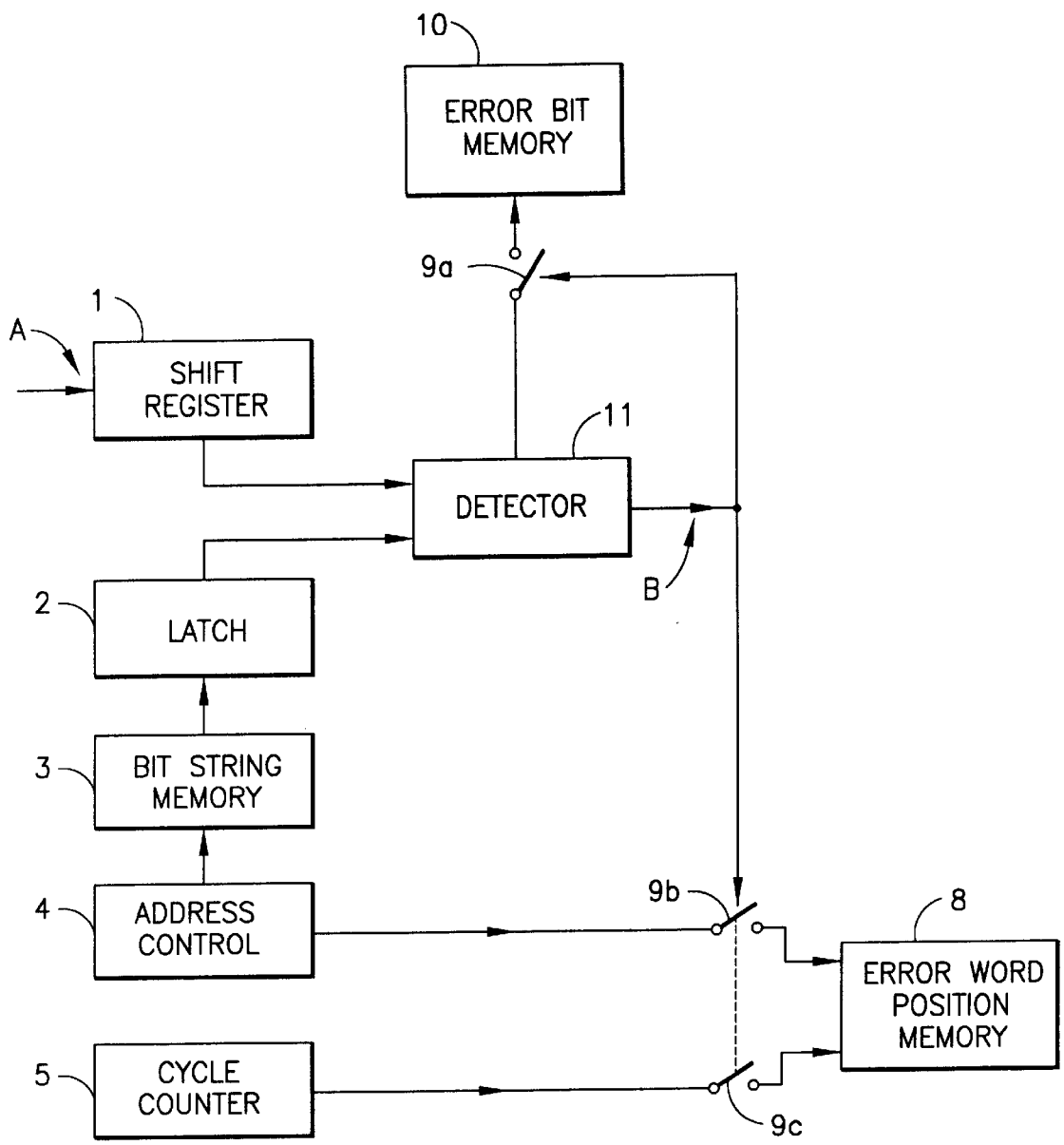
FIG. 3 is a block diagram showing a second embodiment of the invention.

FIG. 3 shows a second embodiment of the invention. Constituent elements which perform the same functions as in FIG. 1 are given the same numbers. In FIG. 3, a detector 11 detects errors, word by word, compares the bits in the words, generates error signals in the positions of the bits where there is disagreement, and, if there is even one bit where the strings disagree, generates an error detection signal B in the same manner as in FIG. 1. If an error detection signal has been generated, switch 9a closes and the erroneous bit information is stored in error bit memory 10. That is, if there is an error in a word, the position information of this error bit is stored.

In the embodiment of FIG. 1, the logical positions of the error bits in the words are obtained through calculation by comparing the words that contain errors, which are stored in error word content information memory 6, with the corresponding words of the correct bit string. The embodiment of FIG. 3, on the other hand, employs a method in which they are obtained by hardware. The rest of the operation is the same as in FIG. 1.

Examples will now be described in which the position information of the error bits obtained by the methods discussed above is converted to bit error information in the desired format and displayed.

Figure 11:
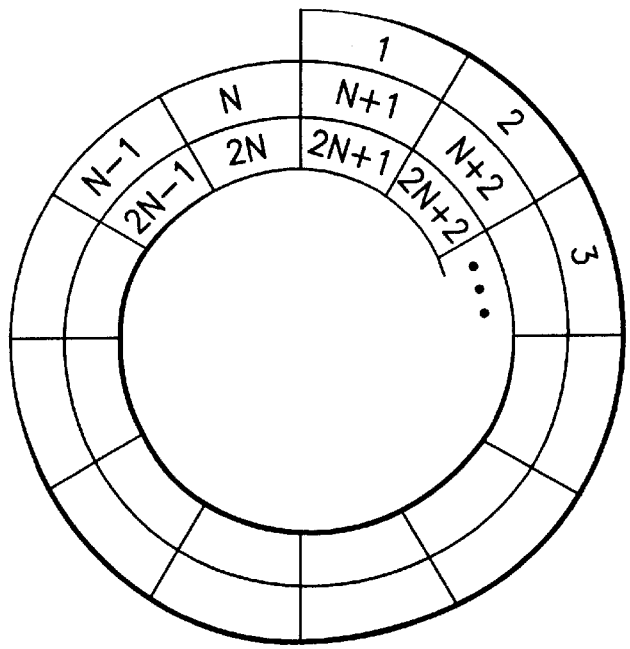
FIG. 11 is a diagram showing the relationship of block numbers and physical positions on a magneto-optical disk recording medium.

FIG. 11 shows the format of a magneto-optical disk. If the relationship between the logical format and the physical format is given, the physical position is obtained unequivocally from the logical position of the word and the position of the bit in the word.

Figure 12:
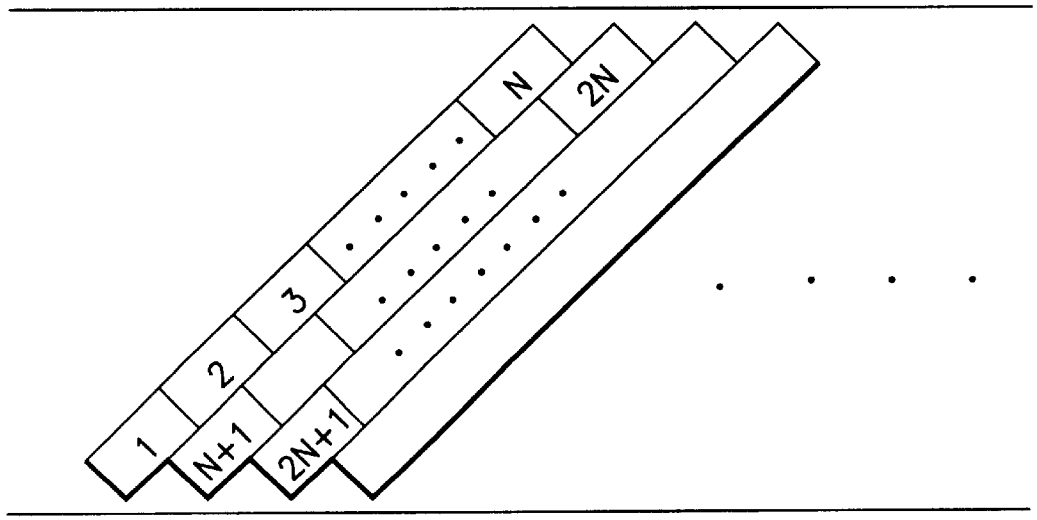
FIG. 12 is a diagram showing the relationship of block numbers and physical positions on a tape recording medium.

Similarly, in the case of tapes, as shown in FIG. 12, if the number of blocks in one line is determined, the physical position can be obtained by calculation from the logical position of the word. In the case of tapes, however, since it is difficult, and at the same time unnecessary, to obtain information concerning which line among all of the lines is involved, the line on which the measurement started is taken as the first line.

Figure 4:
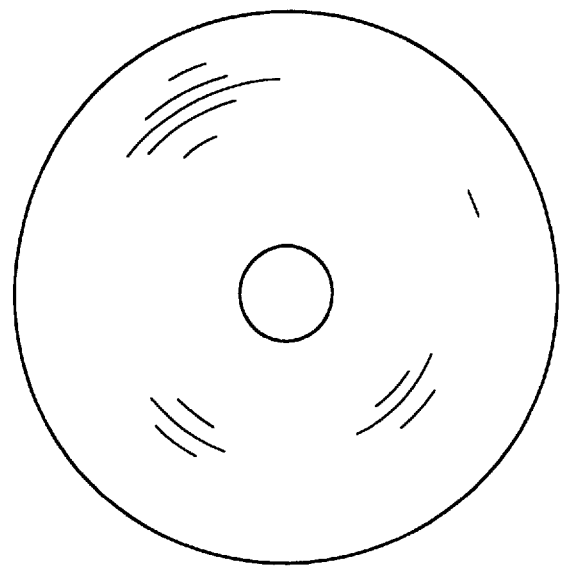
FIG. 4 is a plan view of a disk wherein areas of burst errors are shown by lines.
Figure 5:
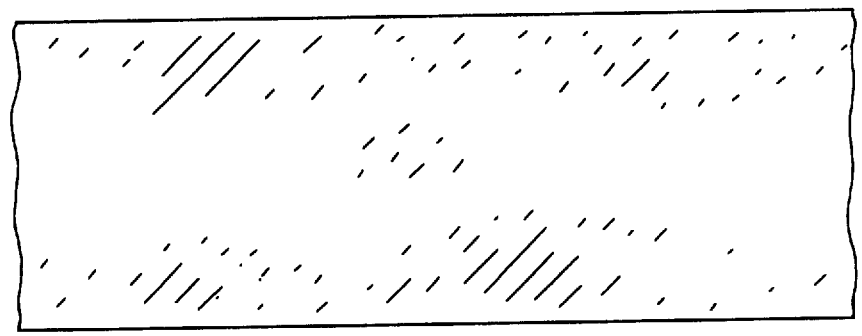
FIG. 5 is a plan view of a tape wherein areas of burst errors are shown by lines.
Figure 6:
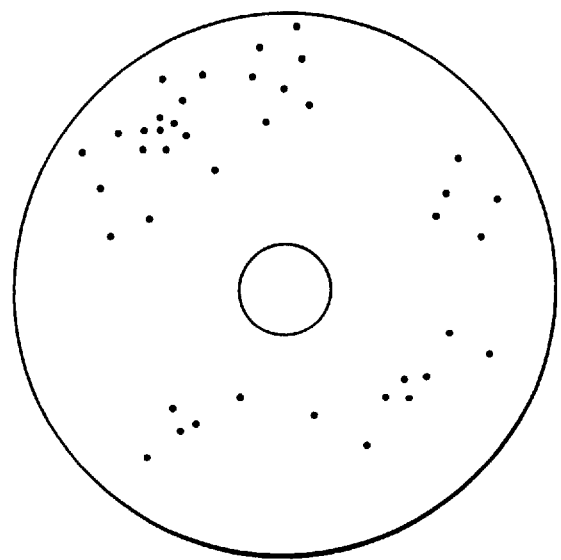
FIG. 6 is a plan view of a disk wherein bit errors are shown by dots.
Figure 7:
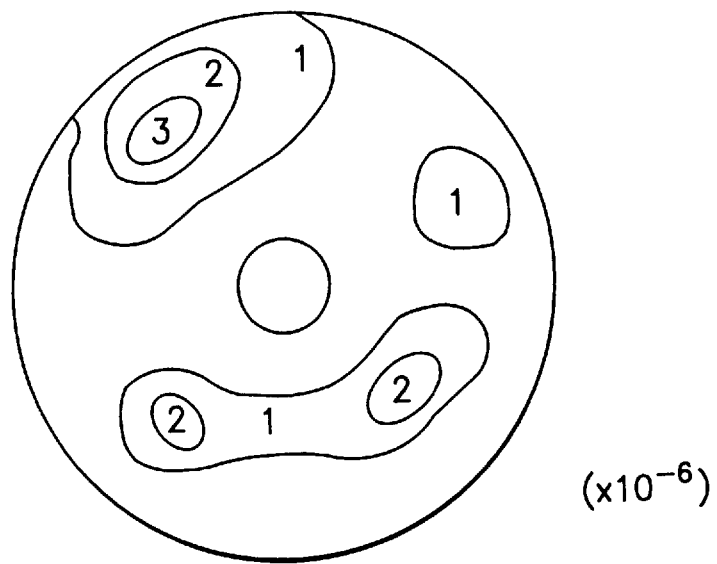
FIG. 7 is a plan view of a disk wherein areas of like bit errors are shown by contours
Figure 8:
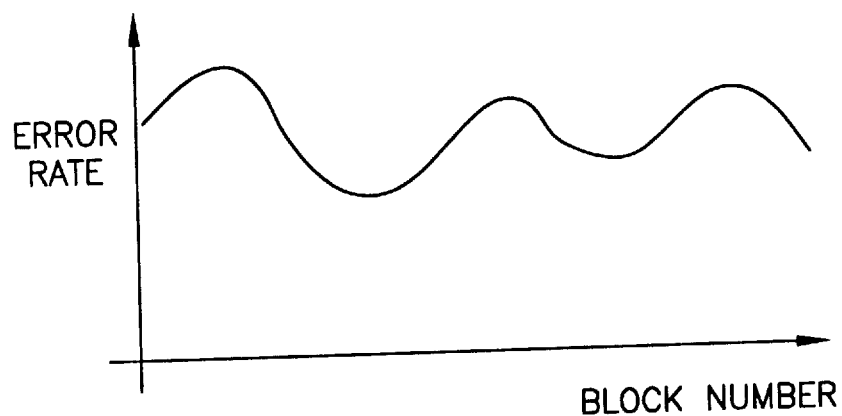
FIG. 8 is a diagram showing an example of prior art wherein a bit error rate is plotted versus data block number.
Figure 9:
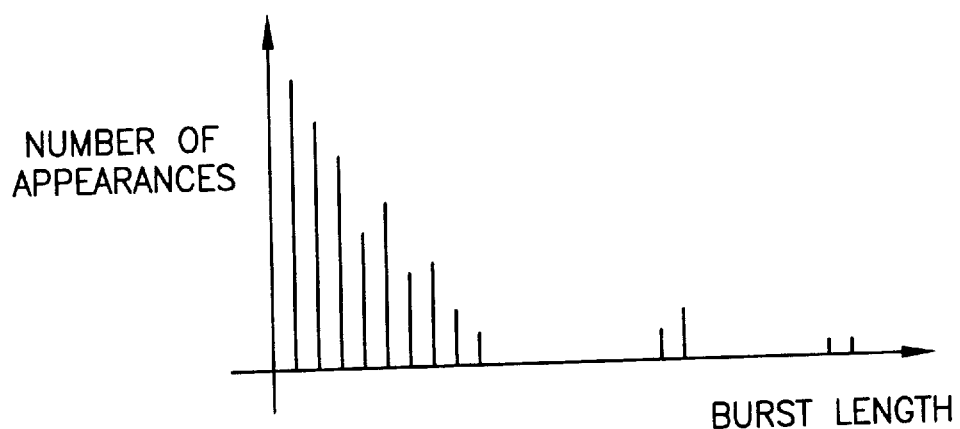
FIG. 9 is a diagram showing an example of prior art wherein a number of appearances of bit errors is plotted versus burst length.

Therefore, if the logical positions of bits containing errors are stored, the physical positions can be obtained simply by calculation. Moreover, it is also possible to nudge whether there are burst errors; the burst length can be obtained from the position information of the error bits and, as in the examples shown in FIGS. 4 and 5, the physical positions and burst lengths of the burst errors can be displayed. FIG. 4 is an example of a disk, and FIG. 5 an example of a tape. Furthermore, as in FIG. 6, by showing the positions of the bit errors by dots, the bit error rates can be displayed as a contour map, as shown in FIG. 7.

Several embodiments of this invention have been described above, but this invention is not limited to the methods, arrangements, or other elements of the embodiments. If desired, changes in the structure of this invention are permitted, as long as its scope is not exceeded.

Effectiveness of the Invention

By means of this invention, logical bit positions of bits in which errors have occurred can be efficiently determined and stored in memory. Moreover, since the positions of the error bits are stored in memory, if the stored values are processed by calculation, they can be converted into bit error information in any desired format, which is advantageous for practical use.

Figure 10:
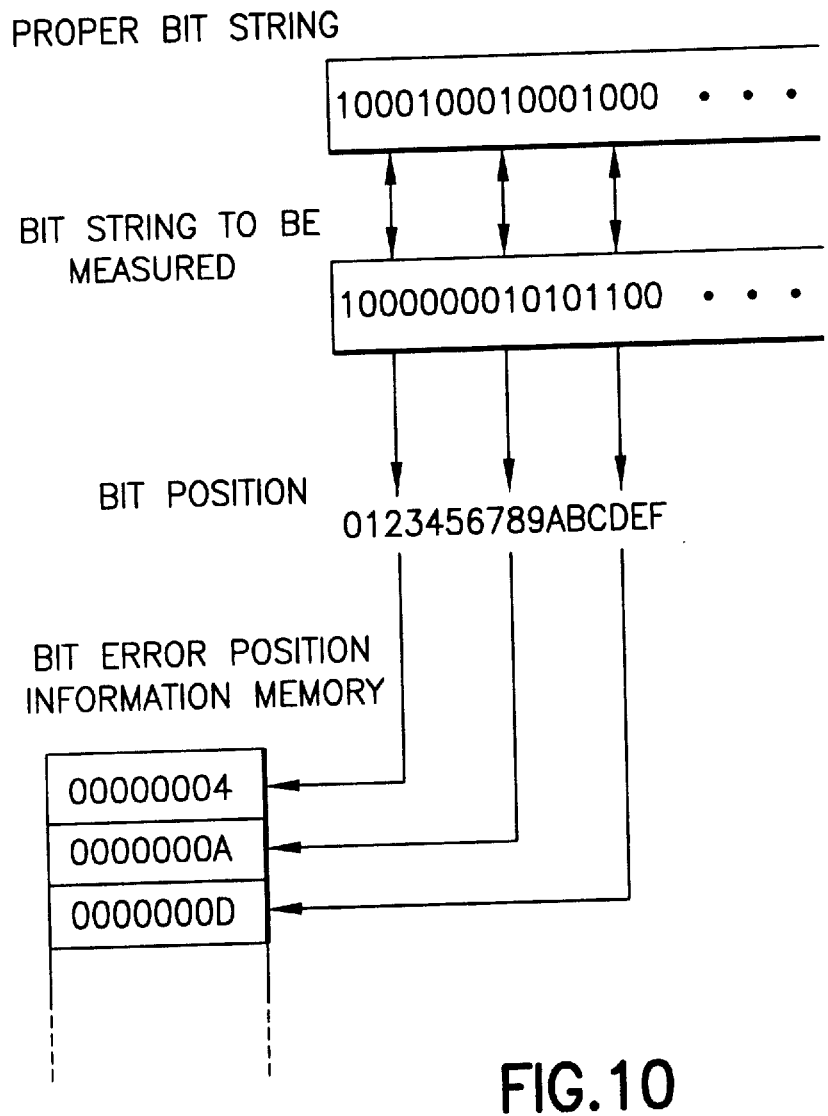
FIG. 10 is a diagram showing an example of prior art wherein error bit position information is stored in memory.

Moreover, since the units in which the error position information is stored are the words in which errors occur, the memory capacity needed is less than in the case of the first prior art technique discussed above. Next, the invention enables memory capacity to be conserved in comparison with the second prior art example. Comparing the second prior art example with this invention, an example in which a bit string to be measured has a length of approximately 4 Gbits will be considered. In the prior art example shown in FIG. 10, 32 bits are needed to store one error in memory. Therefore, the required capacity of an error bit position information memory is (32×number of errors) bits. On the other hand, in this invention, 32 bits (8 bits for the cycle counter and 24 bits for the address) are needed in error word position information memory 8 and 16 bits in the error word content memory 6, for a total of 48 bits, for each word with an error. Therefore, in the case in which the error rate is extremely low, the prior art example can make do with a smaller memory capacity, but in cases of consecutive errors, such as burst errors, or in cases in which the error rate is high, the method of this invention requires a smaller memory capacity. Thus, using this invention, there is the advantage that errors of long bit strings can be stored efficiently without relationship to the size of the error rate of the measured bit string.

Furthermore, in the second prior art example, when one wants to perform real-time processing, a design is required in which the bit error information can be written at the rate at which the bit string to be measured is being transmitted. In this invention, since processing is performed in 16-bit word units, one may use a design in which the word error information is written at 1/16 this rate of transmission. Thus, the design is much less difficult and more economical. Moreover, since the correct bit string is stored in bit string memory 3, it is also possible to investigate the presence of bit patterns with high probabilities of having bit errors among certain specific bit patterns.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A bit error measurement device for measuring errors in a test bit string derived from a digital recording means, comprising;

means for producing a correct bit string;

memory means;

means for comparing said correct bit string with said test bit string and storing in said memory means, logical positions of words or bytes where bit errors occur in the test bit string, when said errors are detected in the test bit string;

means for determining and storing in said memory means logical positions of error bits in said words or bytes;

calculation means responsive to values stored in said memory means, for utilizing logical positions of said error bits to derive physical recording positions on the digital recording means which correspond to said logical positions of said error bits; and display means responsive to said physical recording positions derived by said calculation means for displaying a diagram of bit error information, said diagram modeling a form of a digital recording means from which said test bit string is derived and physical positions on said form where bit errors were produced and their distribution.

2. A bit error measurement device in accordance with claim 1, wherein when errors are detected in the test bit string, logical positions of words or bytes in the correct bit string, that correspond to words or bytes in which said errors are found in the test bit string, are stored in said memory means, said logical positions being equivalent to logical positions of words or bytes in the test bit string in which bit errors have been found.

3. A bit error measurement device in accordance with claim 1, wherein, when bit errors are detected in the test bit string, contents of words or bytes in which said bit errors are detected are stored in said memory means, and said contents are compared by said calculation means with contents of corresponding words or bytes in the correct bit string, whereby logical positions of error bits in said words or bytes are determined.

4. A bit error measurement device in accordance with claim 1, wherein bit error information for each bit in said bytes or words of said test bit string is stored in memory locations, and addresses of said memory locations are made the logical position information of error bits in said words or bytes.

* * * * *